(12) United States Patent
Sakatani et al.

(10) Patent No.: US 7,298,917 B2
(45) Date of Patent: Nov. 20, 2007

(54) IMAGE PROCESSING PROGRAM PRODUCT AND DEVICE FOR EXECUTING RETINEX PROCESSING

(75) Inventors: Kazuomi Sakatani, Toyokawa (JP); Tetsuya Itoh, Okazaki (JP); Yoichi Miyake, Sakura (JP); Norimichi Tsumura, Chiba (JP)

(73) Assignee: Minolta Co., Ltd., Osaka (JP)

( * ) Notice: Subject to any disclaimer, the term of this patent is extended or adjusted under 35 U.S.C. 154(b) by 837 days.

(21) Appl. No.: 10/372,954

(22) Filed: Feb. 26, 2003

(65) Prior Publication Data

US 2004/0091164 A1  May 13, 2004

(30) Foreign Application Priority Data

Nov. 11, 2002 (JP) ............................. 2002-327291
Nov. 11, 2002 (JP) ............................. 2003-327290

(51) Int. Cl.
*G06K 9/40* (2006.01)
*G06K 9/32* (2006.01)
*G06K 9/28* (2006.01)

(52) U.S. Cl. ...................................... 382/254; 382/299

(58) Field of Classification Search ................ 382/254, 382/260, 264, 275, 318, 324, 162, 167, 299, 382/300, 298, 312; 348/254, 223.1, 231.6; 358/518, 519, 525
See application file for complete search history.

(56) References Cited

U.S. PATENT DOCUMENTS 4,384,336 A  5/1983  Frankle et al.
5,991,456 A  11/1999 Rahman et al.
6,882,449 B2 * 4/2005 Kimmel et al. ............... 358/1.9

(Continued)

FOREIGN PATENT DOCUMENTS

JP  11-249004  9/1999

(Continued)

OTHER PUBLICATIONS

Jobson, Daniel, J., et al. "A Multiscale Retinex for Bridging the Gap Between Color Images and Human Observation of Scenes." IEEE Transactions on Image Processing, Jul. 1997, vol. 6, No. 7, pp. 965-976.

(Continued)

*Primary Examiner*—Yon J. Couso
(74) *Attorney, Agent, or Firm*—McDermott Will & Emery LLP

(57) ABSTRACT

An image not subjected to color correction, gamma correction, MTF correction and others is used as an image to be subjected to Retinex image processing. Thus, a RAW image prepared only by converting an electric signal of a CCD image sensor by an A/D converter into a digital form is used as an image to be subjected to the Retinex processing. Predetermined gamma correction is performed after the Retinex processing. Thereby, Retinex algorithm substantially modeling functions of a retina and a cortex of a living body exhibits its original performance. The resolution of the original image is lowered, and processing is performed on an image thus produced to produce a blurred image. Then, the resolution of the blurred image is restored to the same resolution as that of the original image, and the Retinex processing is performed. Thereby, the Retinex processing can be performed without increasing memory consumption and extremely lowering an operation speed.

15 Claims, 17 Drawing Sheets

U.S. PATENT DOCUMENTS

2002/0196350 A1* 12/2002 Cooper .................... 348/223.1

FOREIGN PATENT DOCUMENTS

| JP | 2001-076122 | | 3/2001 |
|----|----|----|----|
| JP | P2001-69525 | A | 3/2001 |
| JP | P2001-78025 | A | 3/2001 |
| JP | P2001-245154 | A | 9/2001 |
| JP | 2001-285889 | | 10/2001 |
| JP | P2001-313844 | A | 11/2001 |
| JP | 2002-074356 | A | 3/2002 |
| JP | 2005-515515 | A | 5/2005 |
| WO | WO 02/089062 | A2 | 11/2002 |

OTHER PUBLICATIONS

"Improvement of Image Appearance by Modified Retinex Model", Masaaki Kobayashi and Hiroaki Kotera, transactions of Color Forum Japan 2001 (47th optical four institutions joint meeting, Nov. 13-15, 2001).

* cited by examiner

IMAGE PROCESSING PROGRAM PRODUCT AND DEVICE FOR EXECUTING RETINEX PROCESSING

This application is based on Japanese Patent Application Nos. 2002-327290 and 2002-327291, the entire content of which is hereby incorporated by reference.

BACKGROUND OF THE INVENTION

1. Field of the Invention

The present invention relates to an image processing program product and an image processing apparatus, and particularly to an image processing program product and an apparatus for performing Retinex processing as a part of processing effected on output images of digital cameras and film scanners.

2. Description of the Related Art

In a conventional field of image processing, a Center/Surround Retinex processing has been proposed as an image processing technology, in which functions of a retina and a cortex of a living body are substantially modeled (e.g., U.S. Pat. No. 5,991,456).

The Retinex processing is a method for correcting image information forming digital data. There are various modifications of the Retinex processing. In this specification, however, correction methods, in which the visual sensation is modeled and surrounding information with respect to a center pixel (i.e., pixel of interest) is taken into consideration, are collectively referred to as "Retinex processing". Expanded Retinex to be described later is one of forms included in the Retinex processing. According to the Retinex processing, since gain adjustment locally changes in accordance with light and darkness in the image, an effect of compressing a dynamic range can be achieved.

In connection with Center/Surround Retinex algorithm, Single Scale Retinex (SSR) and Multi-Scale Retinex (MSR) have been known. Algorithm of the SSR and MSR will now be described.

The Single Scale Retinex (SSR) is expressed by the following formula (1). The processing in formula (1) is executed on each of R, G and B channels, and results are integrated to provide a color output image.

$$T_i(x, y) = \log I_i(x, y) - \log\{F(x, y) * I_i(x, y)\} \quad (1)$$

$$(i=R, G, B)$$

where "*" represents a convolution integral. $T_i(x, y)$ represents a pixel value after the SSR processing, and $I_i(x, y)$ represents a pixel value of an original image. $F(x, y)$ is a function used in a filter for producing a blurred image in view of pixels surrounding the center pixel. For example, $F(x, y)$ may be a Gaussian function, in which case $F(x, y)$ satisfies the following relationships (2) and (3).

$$F(x, y) = K \cdot \exp\{-(x^2+y^2)/c^2\} \quad (2)$$

$$\Sigma\Sigma F(x, y) = 1 \quad (3)$$

where c represents a constant determining a peripheral spread in the Gaussian function, and is referred to as a kernel value. The constant K is determined to satisfy the formula (3). It is generally known that a smaller value of c increases an effect of edge enhancement in image processing, and a larger value of c increases an effect of dynamic range compression.

Clipping processing is performed for the purpose of improving a contrast in the output image subjected to the SSR processing. Usually, pixel values within lower and higher 3% ranges in a histogram distribution are clipped, and then are subjected to linear transformation to be assigned to digital values corresponding to the number of output bits (e.g., 8 bits).

FIG. 18 illustrates specific processing of SSR using the Gaussian function for producing a blurred image.

Referring to FIG. 18, processing is effected on an original image (processing target image) D2 having i=R, G and B. In FIG. 18, P2 indicates an image produced by combining R, G and B in the original image.

Each pixel value in D2 is represented as $I_i(x, y)$. For producing a blurred image D4, an operation of $I_i(x, y)*G(x, y)$ is performed. $G(x, y)$ is a Gaussian function.

Processing is performed to divide each pixel value of the original image by the pixel value of the blurred image, and a logarithm of the result is obtained so that an image D5 subjected to the Retinex processing is obtained. Each pixel value of image D5 is represented by $R_i(x, y)$. By combining images D5 formed of R, G and B, image P1 subjected to the Retinex processing is obtained.

According to the Multi-Scale Retinex (MSR), various different values are used as constant c in formula (2). Thereby, the SSR processing is performed with the Gaussian functions having different peripheral spreads. The respective results thus obtained are summed and averaged so that the edge enhancement and dynamic range compression are simultaneously achieved.

FIG. 19 illustrates the MSR processing using the Gaussian function.

Referring to FIG. 19, blurred images D4-1, D4-2 and D4-3 are produced based on original image D2, and more specifically are produced with a Gaussian function having a narrow peripheral spread (a filter of a small size), a Gaussian function having a medium peripheral spread (a filter of a medium size) and a Gaussian function having a wide peripheral spread (a filter of a large size), respectively.

Original image D2 is divided by the respective blurred images, and logarithms of the results are obtained to provide images D5-1-D5-3. A higher effect of edge enhancement is achieved in the image processed with a function of a small filter size, and a higher effect of dynamic range compression is achieved in the image processed with a function of a large filter size. By summing and averaging images D5-1-D5-3, the edge enhancement and dynamic range compression can be simultaneously achieved.

Study and research have been zealously conducted for applying the foregoing SSR and MSR processing to image data, which is produced in a digital form from negative films or the like by film scanners, and digital image data produced by digital still cameras.

Japanese Patent Laying-Open No. 2001-245154 discloses a technique, in which a large contrast difference between different regions in an image is reduced while maintaining a small contrast difference between different regions in the image.

"Improvement of Image Appearance by Modified Retinex Model", Masaki Kobayashi and Hiroaki Kotera, transactions of Color Forum JAPAN 2001 (47th optical four institutions joint meeting, Nov. 13-15, 2001) discloses a technique, in which the Retinex processing is formed of linear operations.

The image processing techniques such as a conventional Center/Surround Retinex algorithm already described suffer from problems of:

shift of a whole tint in an image using colors shifted to a large extent, and unnatural saturation of luminance in a bright region such as a face.

For overcoming the above problems, expanded Retinex processing techniques such as:

a manner in which information of the original image is added to an output image to a certain extent, a manner in which Retinex processing is effected on only luminance information, and a manner in which portions of certain luminance or higher in a blurred image already subjected to filtering with a Gaussian function is rounded, have been proposed for suppressing the extreme shift of the tint and the unnatural luminance saturation in bright regions have been proposed.

According to the image processing techniques such as a conventional Center/Surround Retinex algorithm already described, calculation processing for producing a blurred image becomes heavy particularly when an original image has a high resolution. This results in problems of increase of memory consumption and lowering of processing speed.

SUMMARY OF THE INVENTION

A first object of the invention is to provide a new image processing program product, which can exhibit original characteristics of the Retinex image processing technique modeling functions of a retina and a cortex of a living body without depending on contents of a target image.

A second object of the invention is to provide an image processing program product, which can perform Retinex processing without causing increase of memory consumption and extreme lowering of a processing speed.

For achieving the above objects, an image processing program product for executing Retinex processing by a computer according to an aspect of the invention uses a RAW image as an original image to be processed.

According to the invention, since the RAW image is used as the target of the Retinex processing, original characteristics of the Retinex processing can be achieved.

According to another aspect of the invention, an image processing program product for executing Retinex processing by a computer is configured to execute, by the computer, a first step of producing an image by lowering a resolution of an original image to be processed, a second step of producing a blurred image from the image produced by lowering the resolution of the original image, a third step of restoring the resolution of the blurred image to that of the original image, and a fourth step of executing the Retinex processing based on the original image and the blurred image having the resolution restored to the resolution of the original image.

According to this invention, the image is produced by lowering the resolution of the original image to be processed, and the blurred image is produced from the image produced by lowering the resolution of the original image. Therefore, the invention can provide the image processing program, which can perform the Retinex processing without causing increase of the memory consumption and extreme lowering of the operation speed.

According to still another aspect of the invention, an image processing program product of producing a blurred image with a degree of blur corresponding to a resolution of an original image and using Retinex processing is configured to execute, by a computer, a first step of producing an image by converting the resolution of the original image to a predetermined resolution, and a second step of producing the blurred image from the produced image.

According to yet another aspect of the invention, an image processing program product for executing Multi-Scale Retinex processing by a computer is configured to execute, by the computer, a first step of producing a plurality of images by lowering a resolution of an original image to be processed to multiple levels, a second step of producing a blurred image of each of the plurality of images by using a predetermined filter, a third step of restoring the resolutions of the plurality of produced blurred images to the resolution of the original image, and a fourth step of executing Multi-Scale Retinex processing based on the original image and the plurality of blurred images having the resolutions restored to the resolution of the original image.

According to the invention, the plurality of images are produced by lowering the resolution of the original image to be processed to the multiple levels, the blurred image of each of the plurality of images is produced by using the predetermined filter, and the Multi-Scale Retinex processing is executed based on the blurred images thus produced. Thereby, the invention can provide the image processing program, which can perform the Multi-Scale Retinex processing without causing increase of the memory consumption and extreme lowering of the operation speed.

According to further another aspect of the invention, an image processing program product for executing Multi-Scale Retinex processing by a computer is configured to execute, by the computer, a first step of preparing a plurality of images including an original image by producing at least one image of a lower resolution from the original image to be processed, a second step of producing blurred images from at least two of the plurality of images by using a predetermined filter, a third step of restoring the resolution of each of the at least two blurred images to the resolution of the original image if the at least two blurred images have the resolutions different from the resolution of the original image, and a fourth step of executing the Multi-Scale Retinex processing based on the original image and the at least two blurred images having the resolution of the original image.

According to this structure, it is not necessary to prepare filters of a plurality of sizes for performing the Multi-Scale Retinex processing so that the program itself can be small in capacity, and can be simple. In the case where the blurred image is not produced from the original image, but is produced from each of a plurality of images of low resolutions prepared by lowering the resolution to different levels, respectively, the invention can provide the image processing program, which can perform the Multi-Scale Retinex processing without causing increase of the memory consumption and extreme lowering of the operation speed.

According to still further another aspect of the invention, an image processing program product for executing Retinex processing based on a blurred image by a computer is characterized in that the blurred image is produced in an optical manner.

According to a further aspect of the invention, an image pickup apparatus for executing Retinex processing includes an image pickup device for shooting an original image to be processed, producing portion for optically producing a blurred image of the original image, and executing portion for executing the Retinex processing based on the original image and the blurred image.

According to the above structure, since the blurred image is produced optically, it is possible to provide an image processing program and an apparatus for the same, which do not require complicated calculation.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
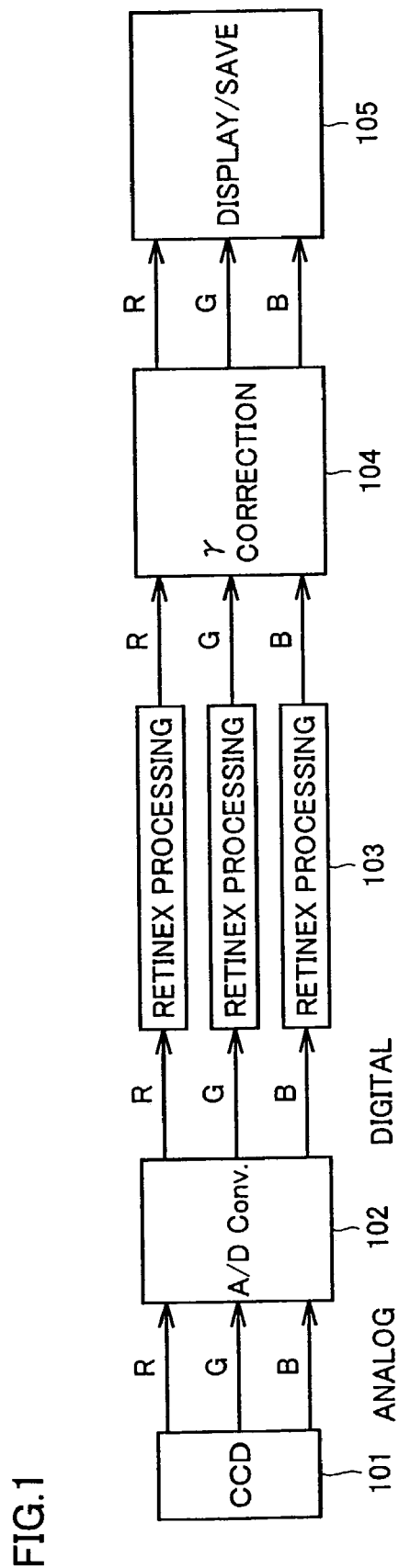
FIG. 1 is a block diagram showing a structure of an image pickup apparatus performing Retinex processing in a first embodiment.

In image processing methods, image processing programs, image processing apparatuses and others disclosed as embodiments of the invention, target images to be subjected to Retinex processing are formed of RAW images directly prepared by A/D conversion of analog signals provided from an image pickup device such as a CCD image sensor or a CMOS image sensor. After the Retinex processing, predetermined gamma correction is performed. In sixth and higher embodiments, the target image may be an image already subjected to the gamma correction. The image "directly prepared by the A/D conversion" means the image not subjected at least to the gamma correction, and preferably means the image not subjected to color correction and MTF correction. Even if the images are already subjected to correction for hardware adjustment required due to variations in sensitivity of elements of image pickup apparatuses and/or tint conversion such as gamut, these images can be deemed as the RAW images in the invention. For example, if the image pickup apparatus is an area-type sensor having color filters, processing for pixel interpolation is performed on image data of each color after the A/D conversion. The image data subjected to such interpolation processing can also be deemed as the RAW image.

Thereby, the Retinex processing, which substantially models functions of a retina and a cortex of a living body, can exhibit its original characteristics.

More specifically, digital image data provided from conventional film scanners and digital still cameras are already subjected to color correction of so-called white balance or the like, gamma correction, MTF correction and others. In the prior art, the Retinex processing and the expanded Retinex processing are performed on digital image data (i.e., target data), which are already subjected to such kinds of image processing. The conventional Retinex processing is effected on the image data, which is already subjected to the several kinds of image processing, for the purpose of improving qualities such as contrast and appearance.

However, the Retinex model is originally aimed at substantially modeling functions of a retina and a cortex of a living body. For sufficiently exhibiting its characteristics, the Retinex model should be applied to raw sensor responses. Conversely, it may be considered as follows. The Retinex processing in the prior art is executed on the image data already subjected to conventional image processing such as color correction, gamma correction and MTF correction, and this may cause conventional disadvantages such as a shift of entire tint in an image, which has many color-shifted regions, and an entire tendency of spitting in a bright region such as a face. Consequently, more complicated processing, i.e., expanded Retinex processing is required for suppressing the above disadvantages.

In view of the above, the embodiments are configured to perform the Retinex processing such as SSR and MSR on raw digital image data, which are subjected only to the A-D conversion of electric signals of the image pickup apparatus such as a CCD image sensor (and is not yet subjected to the gamma correction and others), whereby the Retinex model can exhibit its original effects.

Embodiments of the invention will now be described with reference to the drawings.

First Embodiment

FIG. 1 is a block diagram showing a structure of an image pickup apparatus performing Retinex processing in a first embodiment. In FIG. 1, arrows indicate flows of image data.

Referring to FIG. 1, an image pickup apparatus includes a CCD image sensor 101 serving as an image pickup device, an A/D converter 102, a Retinex processing portion 103, a gamma correcting portion 104 and a display/save portion 105.

CCD image sensor 101 produces analog signals R, G and B (i.e., electric signals) from incident light by a photoelectric conversion. A/D converter 102 converts analog signals R, G and B into discrete digital signals R, G and B, e.g., of eight bits. Retinex processing portion 103 conducts the Retinex processing such as SSR or MSR on digital image signals, which are subjected only to the A/D conversion by A/D converter 102, and particularly on each of R, G and B channels independently of each other.

Gamma correcting portion 104 performs predetermined gamma correction, which is required in a later display/save step, on the Retinex output obtained by Retinex processing portion 103.

Finally, the display/save portion 105 displays the image data, which is subjected to the predetermined gamma processing by gamma correcting portion 104, on a monitor or save it on a hard disk.

The structure shown in FIG. 1 can be achieved by hardware within a digital still camera. However, if a digital camera, which can provide image data subjected to only A/D conversion as RAW images, is used, the foregoing Retinex processing, gamma correction processing and other image processing can be executed in a software manner on the image data temporarily saved in the RAW format by using an application installed in a personal computer or the like.

Since the Retinex processing expressed by the foregoing formula (1) includes a convolution integral, the processing speed significantly depends on a size of a filter, e.g., of a Gaussian function expressed by F(x, y) and an image size itself. In general, Retinex processing uses a filter of a very large size, and a filter of a size of kernel value c equal to about 100 is often used even for images of a relatively low resolution (e.g., VGA of 640×480 pixels). In this case, it takes several hours to complete the processing even by a recent personal computer capable of high-speed operation. This is not practically accepted.

For fast execution of the convolution integral, it has been known to use Fourier transform, which is a manner of executing calculation in a frequency range. To discrete signals such as a digital image, fast processing manners such as FFT (Fast Fourier Transforms) or DFT (Discrete Fast Fourier Transforms) can be applied. The convolution integral of the foregoing formula (1) can be expressed in the following formula (4) when an image has a size of a power of 2.

$$F(x, y)*I_i(x, y) = FFT^{-1}[FFT[F(x, y)] \cdot FFT[I_i(x, y)]] \quad (4)$$

where $FFT^{-1}$ represents an inverse FFT, and "·" represents multiplication in a frequency region. In this case, the processing speed is independent of the filter size of the Gaussian function expressed by F(x, y), and depends on the image size itself. If the image size is not equal to a power of 2, FFT can be replaced with DFT.

According to the present embodiment, as described above, the Retinex processing is applied to the RAW image subjected to only the A/D conversion, and predetermined gamma correction is performed after the Retinex processing, whereby the Retinex processing can exhibit the original function of substantially modeling the functions of the retina and cortex of the living body.

The RAW image basically represents data prepared by performing only the A/D conversion on the output of CCD. However, the images may be already subjected to correction for hardware adjustment required due to variations in sensitivity of the CCD elements and/or tint conversion such as gamut, and these images may be regarded as the RAW images. For example, if the image pickup apparatus is an area-type sensor having color filters, processing for pixel interpolation is performed on image data of each color after the A/D conversion. The image data subjected to the interpolation processing can be deemed as the RAW image.

In the invention, the image data at least before the gamma correction is referred to as the RAW image, and it is further desirable that the RAW image is not yet subjected to sharpness balance correction and white balance correction.

Second Embodiment

Figure 2:
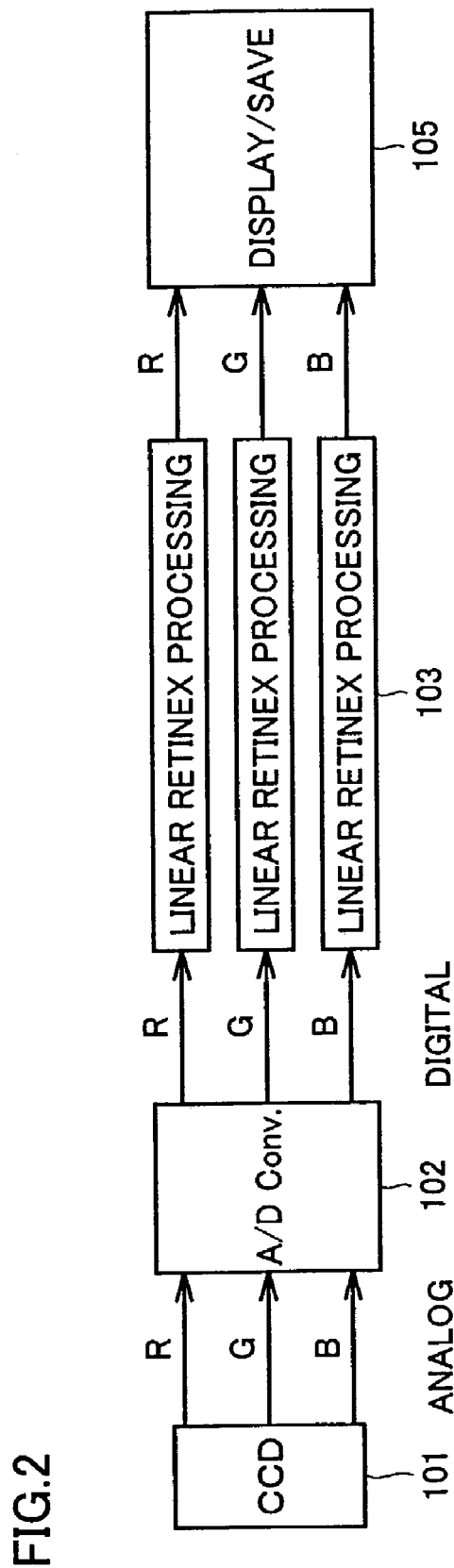
FIG. 2 is a block diagram showing a structure of an image pickup apparatus performing Retinex processing in a second embodiment.

FIG. 2 is a block diagram showing a structure of an image pickup apparatus performing Retinex processing in a second embodiment.

In this embodiment, Retinex processing portion 103 performs linear Retinex processing. The linear Retinex processing is Retinex processing not using a logarithm, and is executed with a ratio between an original image and a blurred image expressed by the following formula (5).

$$T_i(x, y) = I_i(x, y) / \{F(x, y) * I_i(x, y)\} \quad (5)$$

(i=R, G,B)

where "*" represents a convolution integral, similarly to the formula (1). $T_i(x, y)$ represents a pixel value after the linear Retinex processing, and $I_i(x, y)$ represents a pixel value of an original image. F(x, y) is, e.g., a Gaussian function for producing a blurred image satisfying the foregoing formulas (2) and (3).

The linear Retinex processing may be likewise executed by MSR.

Further, Retinex processing portion 103 may perform the processing (gamma correction) of obtaining a (1/γ)th power $T_i(x, y)$, as expressed by the following formula (6):

$$\gamma\{T_i(x, y)\} = T_i(x, y)^{\wedge}(1/\gamma) \quad (6)$$

For displaying an image on a monitor, e.g., set for sRGB, the assumed gamma is equal to 2.2, and the gamma correction is achieved by multiplying $T_i(x, y)$ by the inverse (½.2) thereof. Naturally, such a structure may be employed that the value of gamma is variably adjusted in accordance with a device for display or printing.

Further, it is not necessary to match forcedly the gamma characteristics of the data provided by the Retinex processing with the gamma of a specific monitor or the like. For example, if it is desired to provide characteristics, which are linear with respect to the brightness, the (⅓)th power of linear Retinex is obtained (γ is set to 3).

The gamma-corrected image of the Retinex output obtained by the formula (6) may be processed by clipping the pixel values in upper and lower 3% ranges of the histogram distribution as described above for the purpose of improving the contrast of the image. Naturally, the Retinex output obtained by linear Retinex processing portion 103 can be subjected to the gamma correction after the above clipping processing.

Third Embodiment

Figure 3:
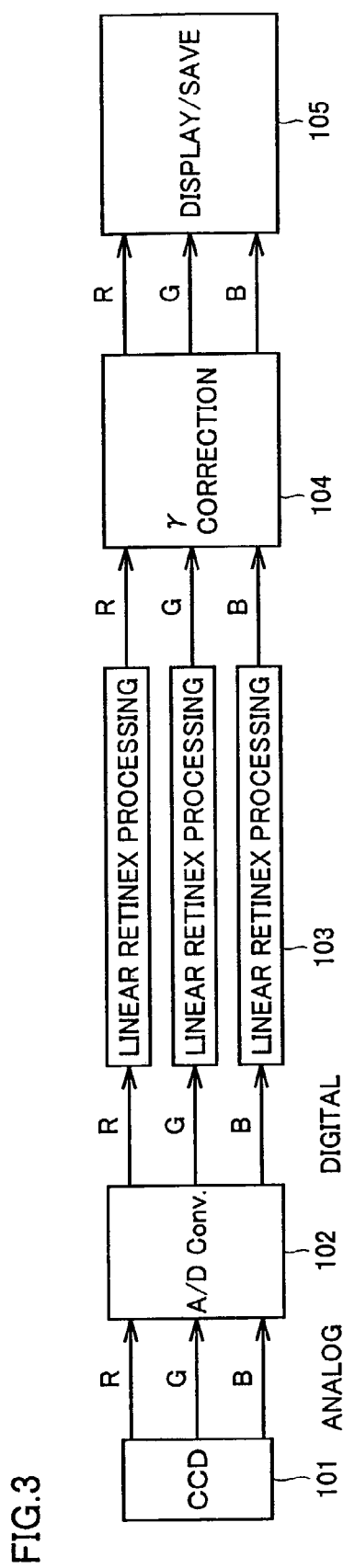
FIG. 3 is a block diagram showing a structure of an image pickup apparatus performing Retinex processing in a third embodiment.

FIG. 3 is a block diagram showing a structure of an image pickup apparatus performing the Retinex processing in a third embodiment.

In this embodiment, Retinex processing portion 103 shown in FIG. 2 performs the linear Retinex processing, and then gamma correcting portion 104 performs the gamma correction for the device. Thereby, the gamma correction can be performed in accordance with the device. Thus, the gamma correction can be performed only by gamma correcting portion 104. Alternatively, processing may be performed in such a manner that Retinex processing portion 103 performs the gamma correction with γ=3 for providing the output having linear characteristics with respect to the brightness as described above, and gamma correcting portion 104 performs the correction in accordance with the device.

Fourth Embodiment

Figure 4:
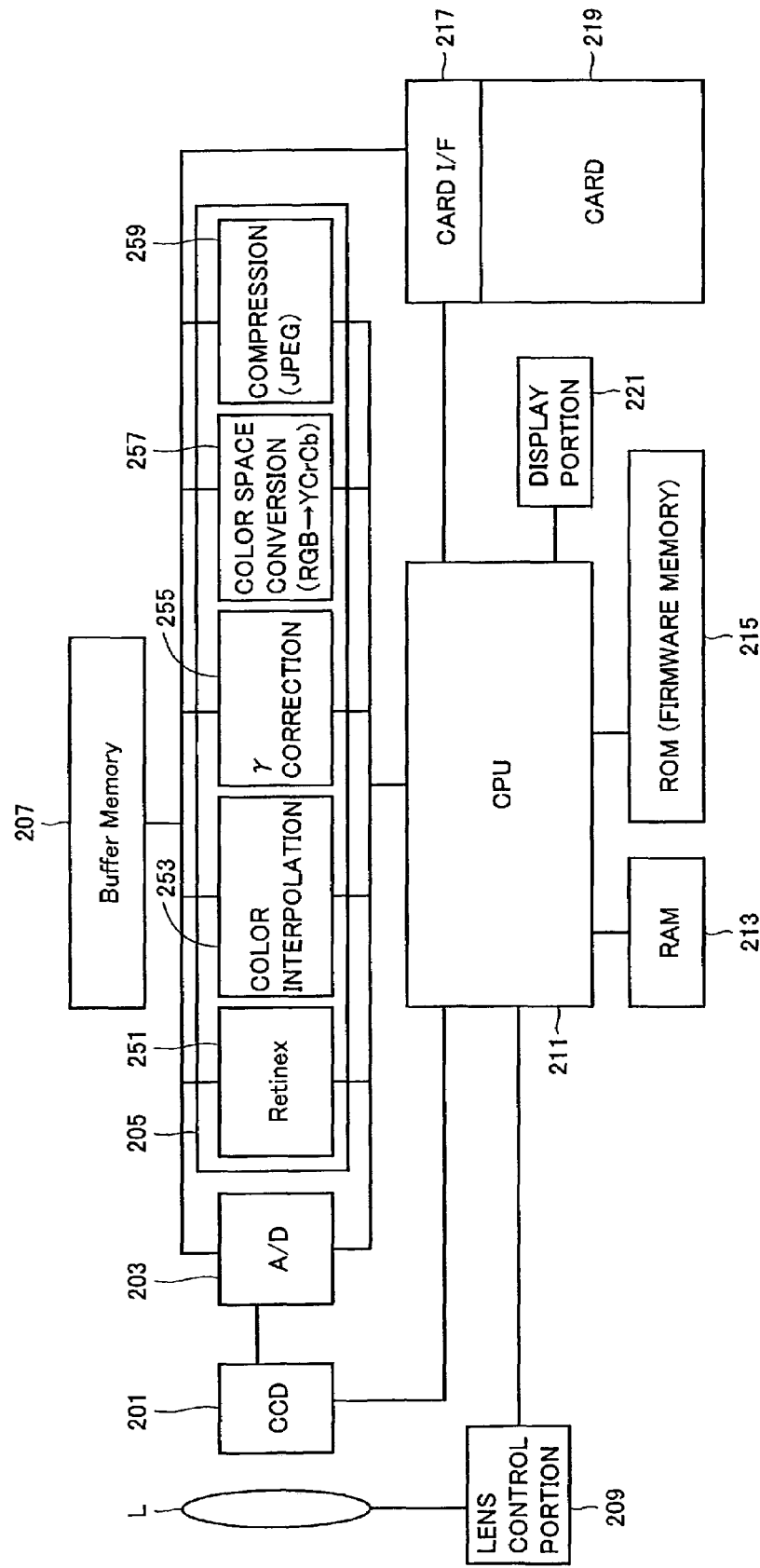
FIG. 4 is a block diagram showing a structure of a digital camera in a fourth embodiment.

FIG. 4 is a bock diagram showing a structure of a digital camera in a fourth embodiment of the invention.

Referring to FIG. 4, the digital camera includes a lens L, a lens control portion 209 for driving lens L, a CCD image sensor 201, an A/D converter 203 for performing the A/D conversion of the output of CCD image sensor 201, an ASIC (Application Specific Integrated Circuit) 205 for image processing, a buffer memory 207, a CPU 211, a RAM 213, a ROM (firmware memory) 215, an image display portion 221, a card interface 217 and a memory card 219.

ASIC 205 includes, as its inner modules, a Retinex processing circuit 251, a color interpolation circuit 253, a gamma correcting circuit 255, a color space converting circuit 257 and an image compressing circuit 259.

In ASIC 205, the modules successively process the output of A/D converter 203 in the sequence from right to left in the figure. The modules in ASIC 205 share buffer memory 207, and CPU 211 performs the timing control for controlling the module accessing the memory.

In this embodiment, the digital camera performs the Retinex processing on the RAW image subjected only to the A/D conversion, and the predetermined image processing is performed after the Retinex processing. Thereby, the Retinex processing can exhibit the original function of substantially modeling the functions of the retina and cortex of the living body.

The circuit structure in FIG. 4 can be applied to digital video cameras, scanners and film scanners.

Fifht Embodiment

Figure 5:
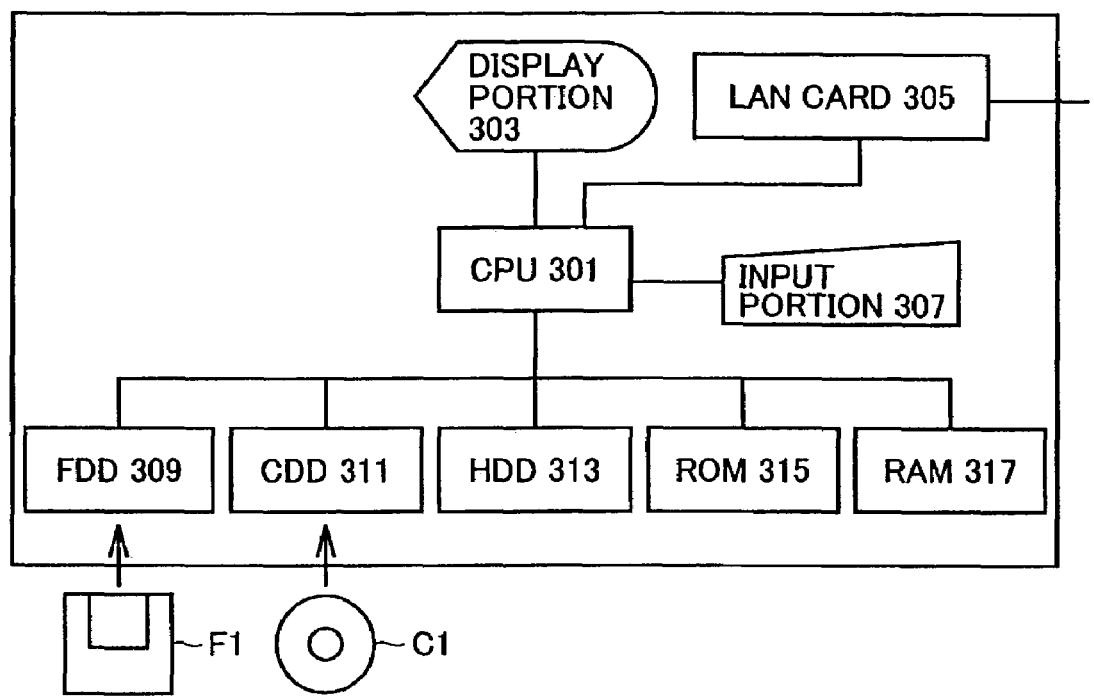
FIG. 5 is a block diagram showing a structure of a computer executing a program in a fifth embodiment.

FIG. 5 is a block diagram showing a structure of a computer executing a program in a fifth embodiment of the invention.

Referring to FIG. 5, the computer includes a CPU 301 for controlling the entire apparatus, a display portion 303, a LAN (Local Area Network) card 305 for connection to a network or external communication, an input portion 307 formed of a keyboard, a mouse or the like, a flexible disk drive 309, a CD-ROM drive 311, a hard disk drive 313, a ROM 315 and a RAM 317.

Programs, which are illustrated in flowcharts to be described later and are used for driving CPU (computer) 301, can be recorded on a record medium such as a flexible disk (F1) and a CD-ROM (C1). The program is sent from the record medium to another record medium such as a RAM, and is recorded therein. The program may be provided to users in the form recorded in the record medium such as a hard disk, ROM, RAM or memory card. The program may be downloaded over the Internet from an external site to a work station or a computer for execution.

Figure 6:
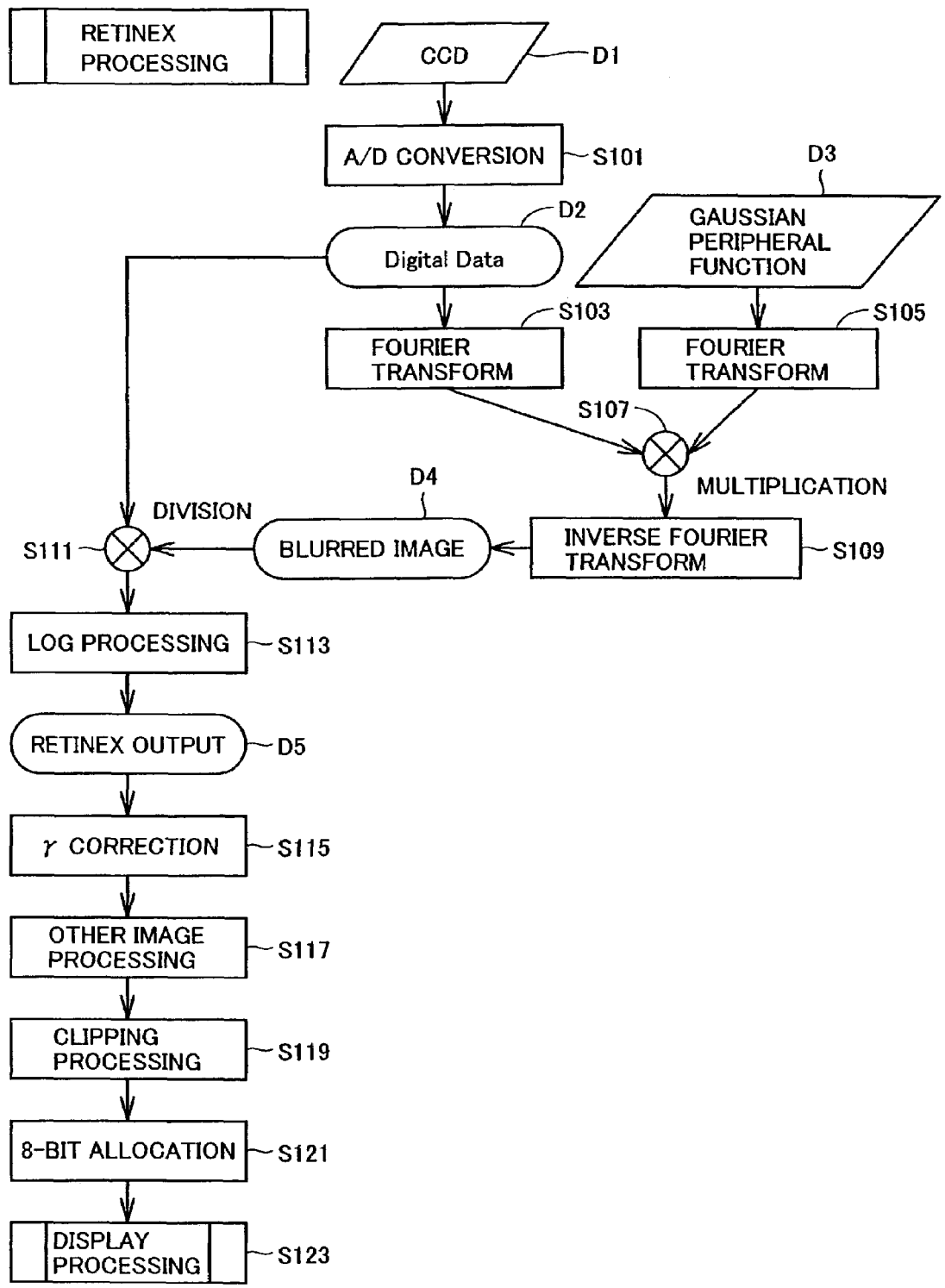
FIG. 6 is a flowchart illustrating Retinex processing executed by the computer in FIG. 5.

FIG. 6 is a flowchart representing the Retinex processing executed by the computer in FIG. 5.

Referring to FIG. 6, analog data D1 obtained by the CCD is converted into data D2 of a RAW image by the A/D converter in a step S101. In a next step S103, data D2 is subjected to Fourier transform by the computer.

In a step S105, Gaussian peripheral function D3 is subjected to the Fourier transform. In a step S107, multiplication is performed in a frequency region of the data obtained in steps S103 and S105. Thereafter, inverse Fourier transform is performed in a step S109 so that a blurred image D4 is obtained.

In a step S111, D2 is divided by D4, and a logarithm of the result is obtained in a step S113 to provide a Retinex output D5.

Thereafter, gamma correction (step S115), other image processing (step S117), clipping processing (step S119) and 8-bit allocation (step S121) are effected on the Retinex output. Thereafter, the image is displayed in a step S123.

Figure 7:
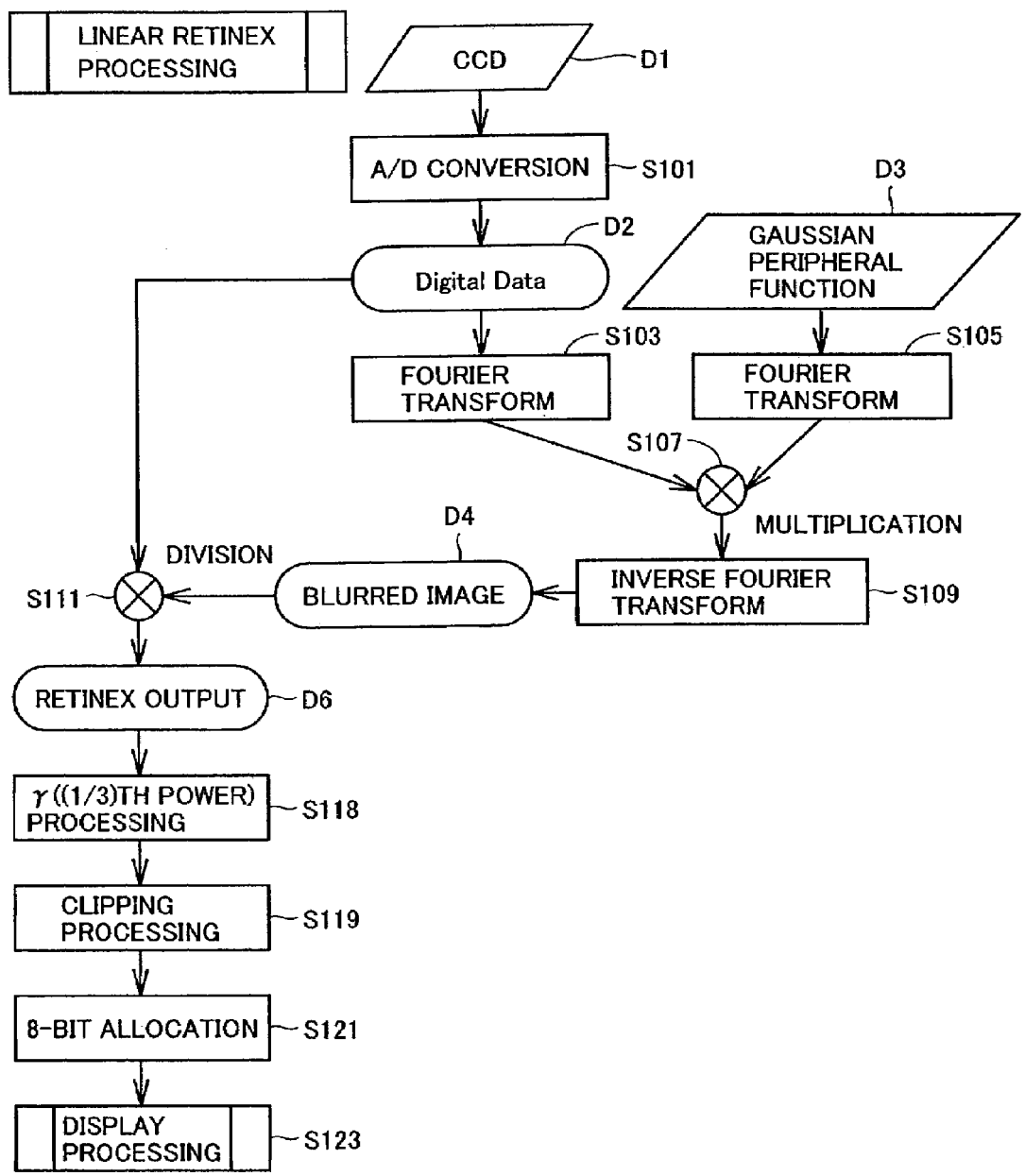
FIG. 7 is a flowchart illustrating linear Retinex processing executed by the computer in FIG. 5.

FIG. 7 is a flowchart illustrating the linear Retinex processing executed by the computer in FIG. 5.

Referring to FIG. 7, the processing in steps S101-S111 is the same as that in FIG. 6, and therefore, description thereof is not repeated. The division in step S111 provides a Retinex output D6. In this embodiment, output D6 is subjected to gamma correction (correction of (⅓)th power of D6) in a step S118. Thereafter, clipping processing (step S119), 8-bit allocation (step S121) and display processing (step S123) are performed.

The foregoing image processing may be effected on image data sent over the Internet or other communication line, and the results of the image processing may be sent to another apparatus over the communication line.

Sixth Embodiment

For example, by using the Fourier transform in the convolution integral as described above, the operation can be performed fast.

However, images are usually two-dimensional, and processing such as FFT and DFT must be executed on the real type data. Therefore, for executing FFT{F(x, y)} and FFT (I$_i$(x, y)} in formula (4), a very large memory is required. When a recent personal computer with one gigabytes of memory is used, images of a relatively low resolution (e.g., VGA: 640×480) can be processed fast without any problem, but images of a relatively high resolution (e.g., FULL: 2560×1920) may not be completely processed due to insufficient memory. Therefore, the above manner is not sufficiently practical under the present circumstances.

In the sixth embodiment, the following processing is performed in the Retinex processing illustrated in connection with the first to fifth embodiments and the prior art for overcoming the foregoing problems.

First, an original image Low_I$_i$(x, y) is prepared by temporarily lowering the resolution of original image I$_i$(x, y). A blurred image is prepared from image Low_I$_i$(x, y).

As manners of converting the resolution, Zero Order, Bi-Linear, Quadratic and Cubic Spline have been known, and one of these manners can be used.

For example, a filter image Low_F(x, y) of a low resolution providing the same image size as original image Low_I$_i$(x, y) of a low resolution is used (i.e., Low_F(x, y) of 640×480 is used when Low_I$_i$(x, y) has a resolution of 640×480), and the convolution integral in formula (7) or the multiplication and inverse FFT processing in the frequency region are executed for producing a blurred image.

$$\text{Low\_}F(x, y) * \text{Low\_}I_i(x, y) = \text{FFT}^{-1}\{\text{FFT}\{\text{Low\_}F(x, y)\} \cdot \text{FFT}\{\text{Low\_}I_i(x, y)\}\} \quad (7)$$

Naturally, the blurred image produced in formula (7) has the resolution different from that of original image I$_i$(x, y) so that the calculation in formula (1) cannot be executed without further processing.

For executing the calculation in formula (1), it is necessary to match the resolutions of the original and blurred images with each other, and the resolution of the blurred image produced by the formula (7) is changed to match with the resolution of original image $I_i(x, y)$ by interpolation (likewise, by a manner of Zero Order, Bi-Linear, Quadratic or Cubic Spline).

This processing may use the same manner as the conversion manner previously used for lowering the resolution of original image $I_i(x, y)$, or may use another conversion manner. By producing the blurred image as described above, the Retinex processing of high-resolution images can be executed fast.

Figure 8:
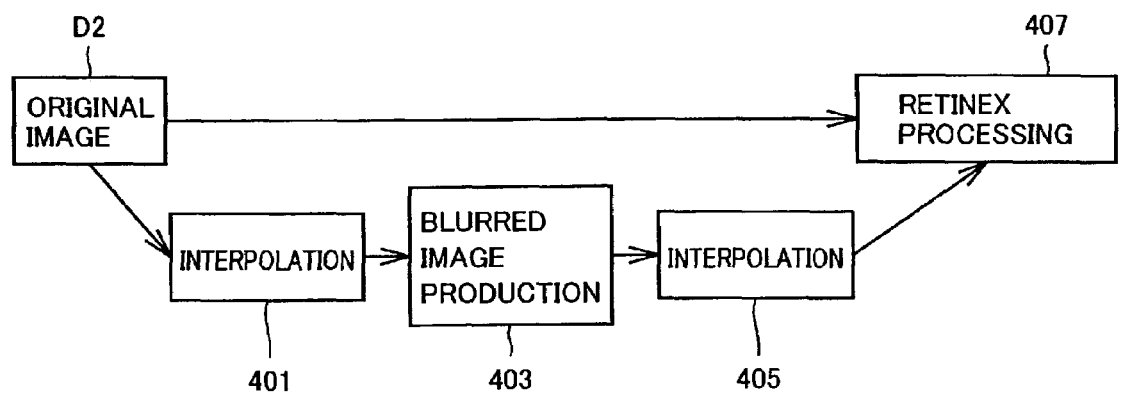
FIG. 8 shows a structure of a Retinex processing portion in an image processing apparatus of a sixth embodiment.

FIG. 8 illustrates a structure of the Retinex processing portion of the image processing apparatus of the sixth embodiment.

Referring to FIG. 8, the Retinex processing portion includes an interpolating portion 401 for performing an interpolating operation to reduce the resolution of original image D2, a blurred image producing portion 403 for producing a blurred image by processing the image of a lowered resolution provided by interpolating portion 401 with a filter, and an interpolating portion 405 for providing the same resolution as original image D2. A Retinex processing portion 407 performs the Retinex processing based on original image D2 and the output image of interpolating portion 405.

Seventh Embodiment

In the sixth embodiment, an image quality (precision) of the output image can be adjusted by changing a degree of lowering of the resolution by interpolating portion 401. For example, present digital cameras are configured to save digital image data in various resolutions, which are classified into FULL (2,560×1,920), UXGA (1,600×1,200), SXGA (1,280×960), XGA (1,024×768) and VGA (640×480) in the order of magnitude.

Accordingly, if prime importance is placed on the image quality, e.g., of the original image of FULL (2,560×1,920), UXGA (1,600×1,200) is selected as the lowered resolution of the original image. If the prime importance is placed on the speed, VGA (640×480) is selected as the lowered resolution of the original image. This processing is performed by interpolating portion 401. In this manner, the blurred image having the resolution, which depends on the selected importance, is produced, and is restored to have the resolution of FULL (2,560×1,920) by the interpolation processing of interpolating portion 405, and Retinex processing portion 407 executes the processing.

Further, the technique of this embodiment may be applied to the Retinex processing of the MSR type.

In the case where the original image has the resolution, e.g., of FULL (2,560×1,920), the blurred images, which are blurred to large, medium and small extents, are produced from original images having the lowered resolutions of VGA (640×480), SXGA (1,200×960) and UXGA (1,600×1,200), respectively. Thereafter, the respective blurred images are restored to have the original resolution of FULL (2,560×1,920) by the interpolating processing, and the Retinex processing and combining are performed.

Thus, in the case where the image is blurred only to a small extent, the resolution is not lowered to a large extent so that an effect of maintaining the image quality (precision) can be expected.

Figure 19:
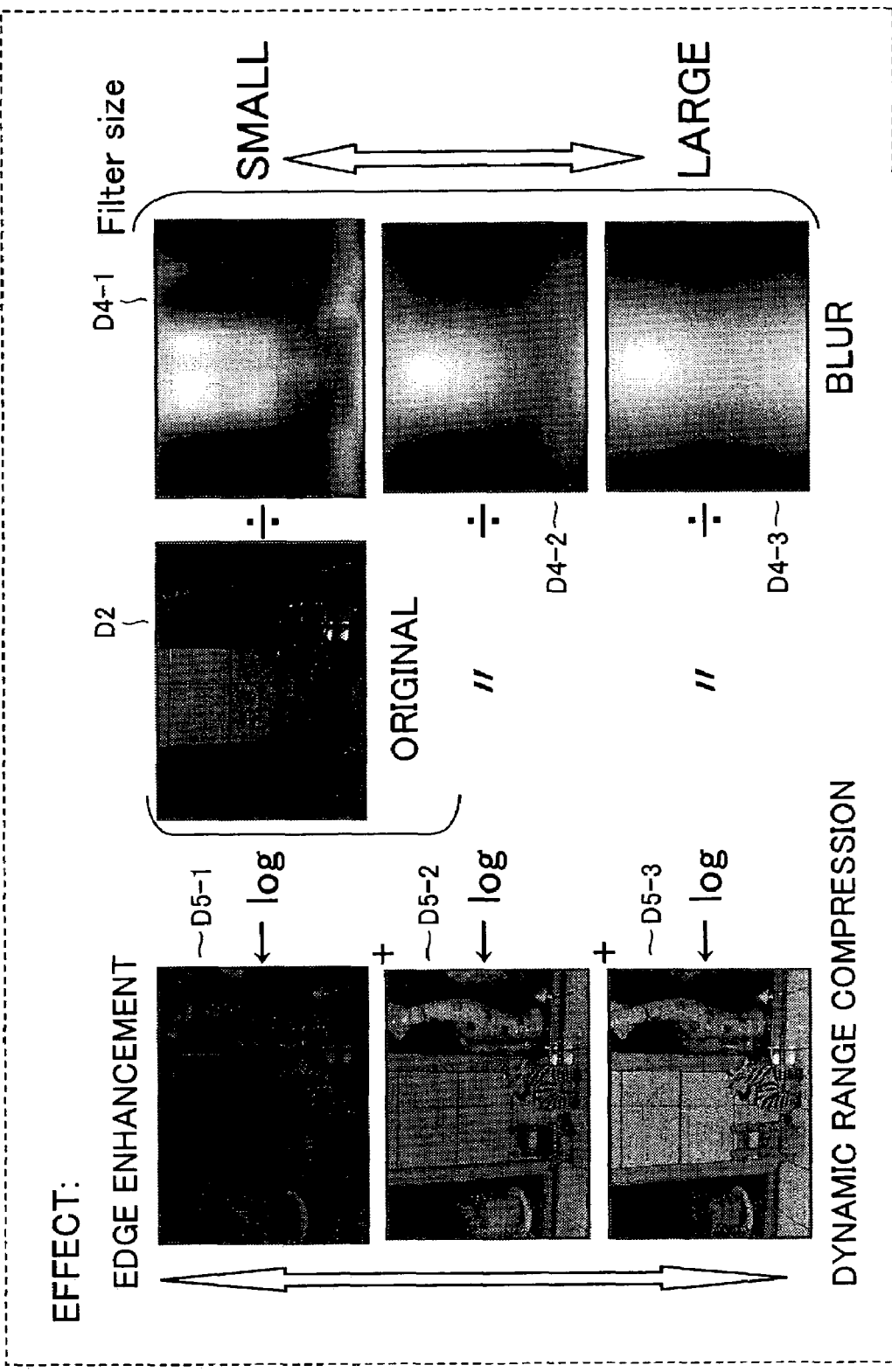
FIG. 19 illustrates MSR processing with a Gaussian function.

In connection with the application to the MSR described above, the size of the filter for blurring the target image may be variable relatively to the size of the target image. Thereby, it is possible to prepare a plurality of images blurred to different extents, respectively. Accordingly, the blurred images, which are blurred to large, medium and small extents, can be produced from the images prepared by lowering the resolution of the original image to VGA (640×480), SXGA (1,200×960) and UXGA (1,600×1,200) with the filter of the same size, respectively, and are restored to the resolution of the original image, whereby the images blurred to large, medium and small extents can be produced. Processing is performed to divide the original image by each of the images blurred to large, medium and small extents (see FIG. 19) so that MSR can be achieved.

Conversely, if digital image data of different resolutions (e.g., UXGA (1,600×1,200) and VGA (640×480)) are processed to produce the blurred images by the Gaussian function having the peripheral spread of the same size, it is apparent that the result of processing of each data is different from that of the other.

Although the resolutions are different from each other, the contents of these images are the same, and it is not preferable that the result of color correction, contrast and degree of edge enhancement vary depending on the resolution. Accordingly, the size of the filter for producing the blurred images is changed depending on the resolution of the images (output images of interpolating portion 401 shown in FIG. 8), from which the blurred images are produced. Thereby, uniform processing effects can be achieved even when the resolutions are different.

Figure 9:
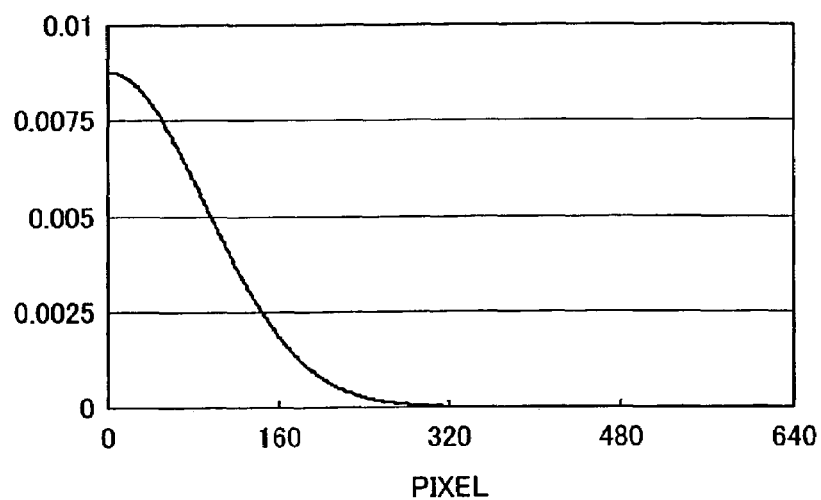
FIG. 9 is a graph illustrating spread of a Gaussian function applied to a low-resolution image in a one-dimensional manner along an X-axis.
Figure 10:
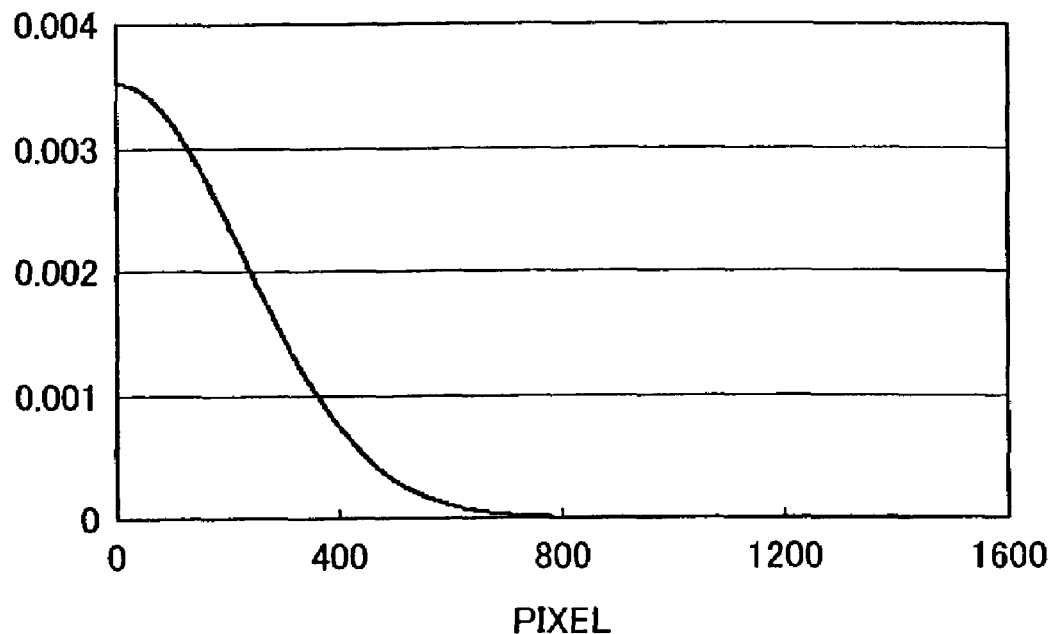
FIG. 10 is a graph illustrating spread of a Gaussian function applied to a high-resolution image in a one-dimensional manner along an X-axis.

For example, FIGS. 9 and 10 are graphs schematically illustrating Gaussian functions having similar peripheral spreads in a one-dimensional manner. In these graphs, X-axis gives the positions of the pixels.

FIG. 9 is the graph illustrating, in the one-dimensional manner, the spread along the X-axis of the Gaussian function applied to the VGA (640×480) image of a low resolution. FIG. 10 is the graph illustrating, in the one-dimensional manner, the spread along the X-axis of the Gaussian function applied to the UXGA (1,600×1,200) image of a high resolution.

These Gaussian functions are different from each other, and have different spreads, respectively. However, forms of curves thereof are geometrically similar when whole images are viewed.

By changing the Gaussian function in accordance with the resolution, both the images having the same contents can be processed to achieve similar Retinex effect.

As described above, the spread of the Gaussian function is changed for providing geometrically similar forms even when the resolutions are different as described above. This can be achieved by adjusting constant c (kernel value) determining the peripheral spread in the Gaussian function of the formula (2) together with the resolution.

For example, it is assumed that a kernel value $C_{VGA}$ is applied to VGA (640×480), and a kernel value of $C_{UXGA}$ is applied to UXGA (1,600×1,200). In this case, the kernel values can be easily calculated by the following formula:

$$C_{VGA} = C_{UXGA} \times (640/1600) \tag{8}$$

Figure 11:
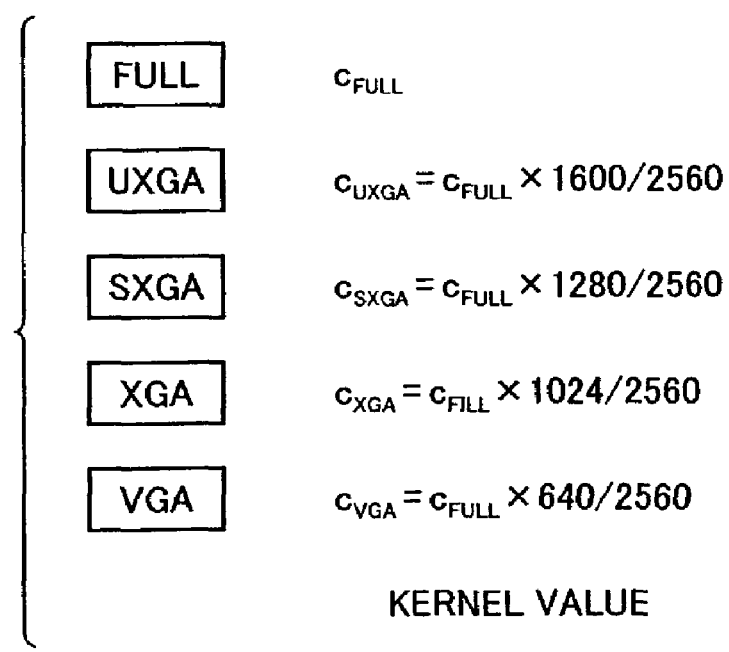
FIG. 11 illustrates calculation formulas for kernel values corresponding to respective resolutions.

In FIG. 11, it is assumed that the image, from which blurred images are to be formed, has the resolution of FULL (2560×1920), and a kernel value $C_{FULL}$ corresponds to this FULL resolution. FIG. 11 illustrates formulas for calculating kernel values, which correspond to the respective resolutions of UXGA (1,600×1,200), SXGA (1,280×960), XGA (1,024×768) and VGA (640×480), from a kernel value $C_{FULL}$, respectively.

The blurred images are produced from images of different resolutions by changing the kernel value, and are subjected to the Retinex processing. This processing can be executed, e.g., inside a digital camera. Alternatively, the processing may be effected on digital image data saved as images of certain resolutions by application software installed in a personal computer or the like.

If functions other than the Gaussian functions shown in FIGS. 9 and 10 are to be used, such functions can be likewise used by changing the filter sizes of respective functions together with the resolutions of the images.

Figure 12:
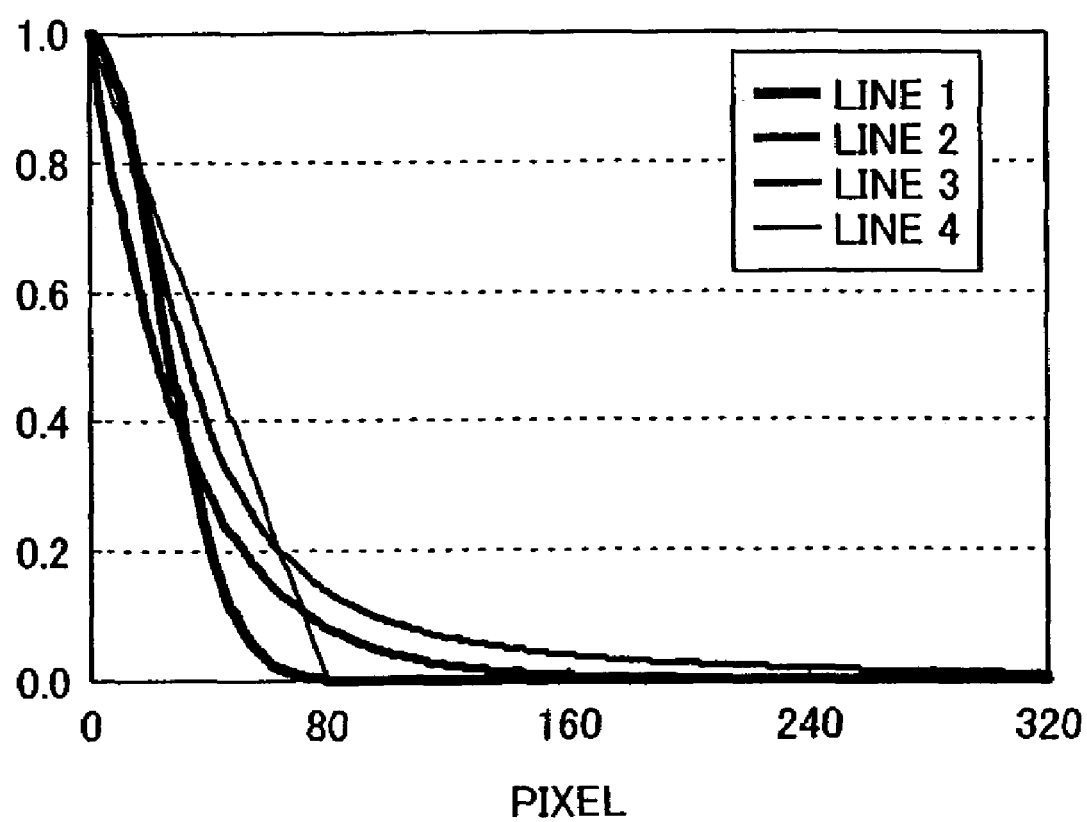
FIG. 12 illustrates peripheral spread of different four functions in a one-dimensional manner.

For example, FIG. 12 illustrates, in a one-dimensional manner, peripheral spreads of different four functions, each of which has a weight of one in a center pixel (pixel of interest) represented at a position of the origin.

In FIG. 12, a line 1 represents a Gaussian function of $\exp(-(x/c_1)^2$, a line 2 represents an exponential function of $\exp(-|x|/c_2)$, a line 3 represents an inverse square function of $1/(1+(x/c_3)^2)$, and a line 4 represents a linear function of $(c_4-x)\cdot c_4$. Accordingly, $c_1$, $c_2$, $c_3$ and $c_4$ correspond to the kernel values in the respective peripheral spread functions. Accordingly, by selecting the kernel values of $c_1$, $c_2$, $c_3$ and $c_4$, the blurred images can be prepared in accordance with the resolution.

Eigth Embodiment

In the sixth embodiment, interpolating portion 401 may be configured to lower the resolution by a degree corresponding to the resolution of original image D2, whereby the image processing can be performed with the same filter.

Figure 13:
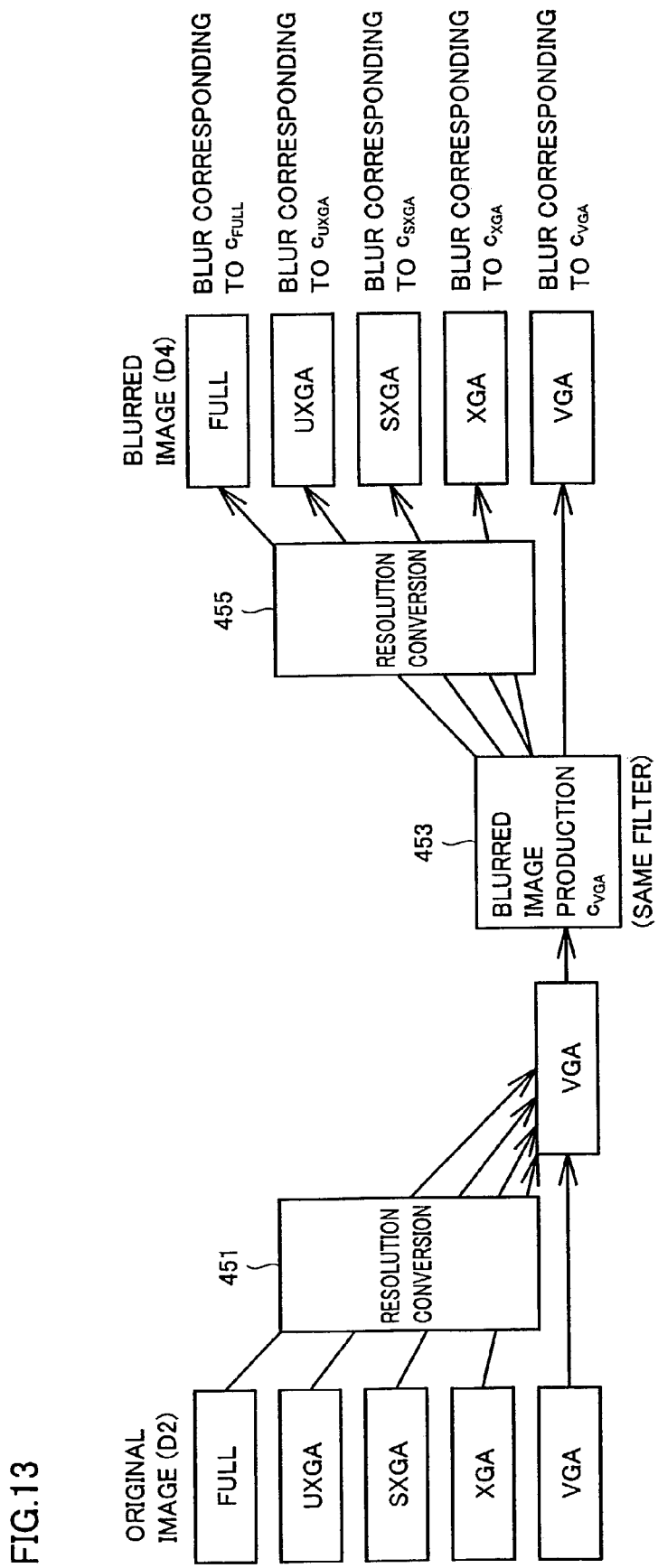
FIG. 13 illustrates processing performed by an interpolating portion 401, a blurred image producing portion 403 and an interpolating portion 405 in an eighth embodiment.

FIG. 13 illustrates processing in an eighth embodiment, and particularly the processing performed by interpolating portion 401, blurred image producing portion 403 and interpolating portion 405 in FIG. 8.

Referring to FIG. 13, a resolution converting portion 451 converts the resolutions in accordance with the resolution of original image D2 to provide images of the same resolution. In FIG. 13, a VGA image is produced by the resolution conversion regardless of the resolution (i.e., FULL, UXGA, SXGA, XGA or VGA) of original image D2.

Thereafter, a blurred image producing portion 453 produces a blurred image with a filter, and a resolution converting portion 455 restores the resolution to the original resolution. In this processing, the images provided by resolution converting portion 451 have the uniform resolution regardless of the resolution of original image D2. Therefore, the blurred images blurred to the substantially same extent can be obtained by using the filter of the same size even if the resolution of the original image changes.

For example, it is assumed that a plurality of images have the same contents and different resolutions, respectively. Any one of these images of different resolutions can be subjected to the processing in FIG. 13 to provide the blurred image, which is blurred to a substantially uniform extent when viewed as a whole, and the Retinex processing can be performed to a substantially uniform extent.

In this embodiment, processing is performed to adjust a relative magnitude or size between the target image to be blurred and the filter, whereby the Retinex processing can be performed to a substantially uniform extent regardless of the resolution of the image to be processed.

Ninth Embodiment

Figure 14:
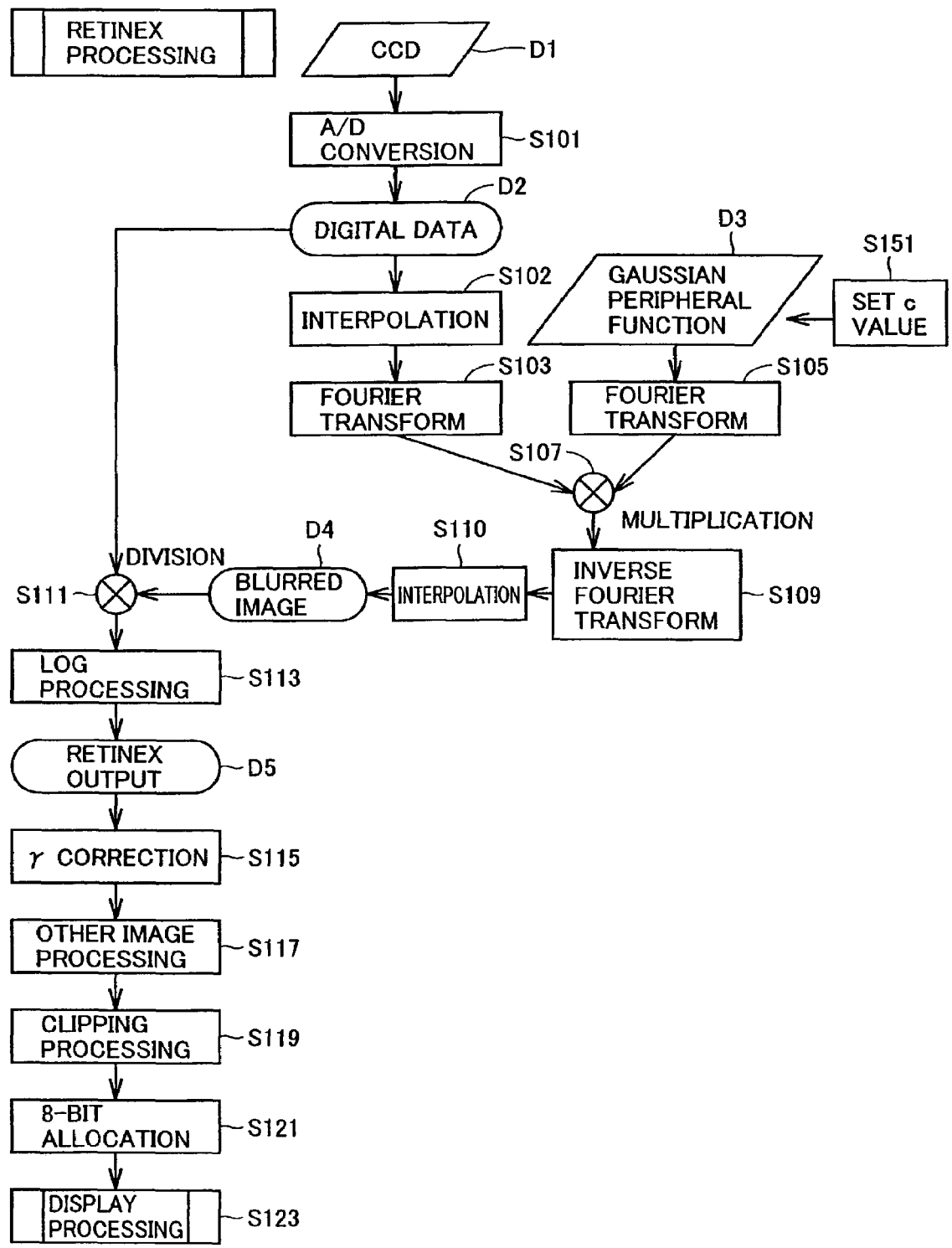
FIG. 14 is a flowchart illustrating Retinex processing in a ninth embodiment.

FIG. 14 is a flowchart illustrating the Retinex processing in a ninth embodiment of the invention.

Referring to FIG. 14, the flowchart differs from the flowchart of FIG. 6 in that interpolation (resolution conversion) of original image D2 is performed in step S102 for producing a blurred image. After the blurred image is produced, interpolation is performed in a step S110 to match the resolution with that of original image D2.

Kernel value c, which determines the spread of the Gaussian function, is determined in accordance with the level of the interpolation in a step S151.

Other processing is the same as that in the flowchart of FIG. 6.

For performing, e.g., MSR, the value of c is kept fixed in step S151, and the level of resolution conversion is changed in step S102 to produce a plurality of images. Thereby, a plurality of images at different blurred levels can be prepared with the same filter. Alternatively, the resolution may be converted to a uniform level, and the value of c may be changed to produce a plurality of images at different blurred levels.

Figure 15:
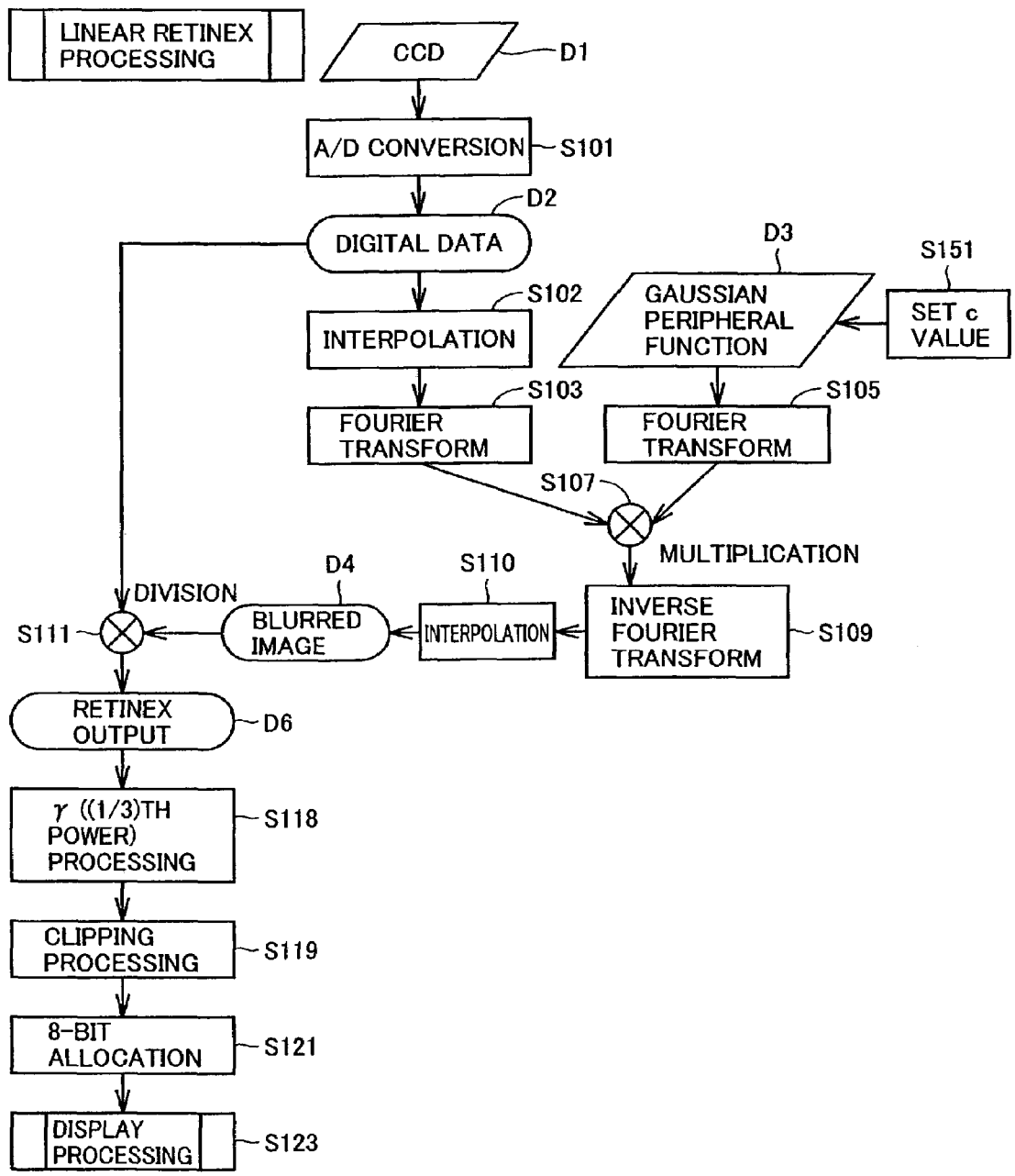
FIG. 15 is a flowchart illustrating a case of changing a resolution of an original image before producing a blurred image, and setting a c-value in the linear Retinex processing illustrated in FIG. 7.

FIG. 15 is a flowchart likewise illustrating the linear Retinex processing illustrated in FIG. 7, and particularly the processing, in which the resolution of the original image is changed to set the value of c before producing the blurred image.

Tenth Embodiment

Instead of producing the blurred image from the original image with the Gaussian function and others, the blurred image can be produced by optically setting an unfocused state, or by using an image pickup element of a low resolution. In the case where an unfocused state is optically attained, the image pickup element such as a CCD for recording the original image may be used also as the image pickup element for recording the blurred image, or may be different therefrom.

The Retinex processing is performed on the original image and blurred image having the same resolution.

Figure 16:
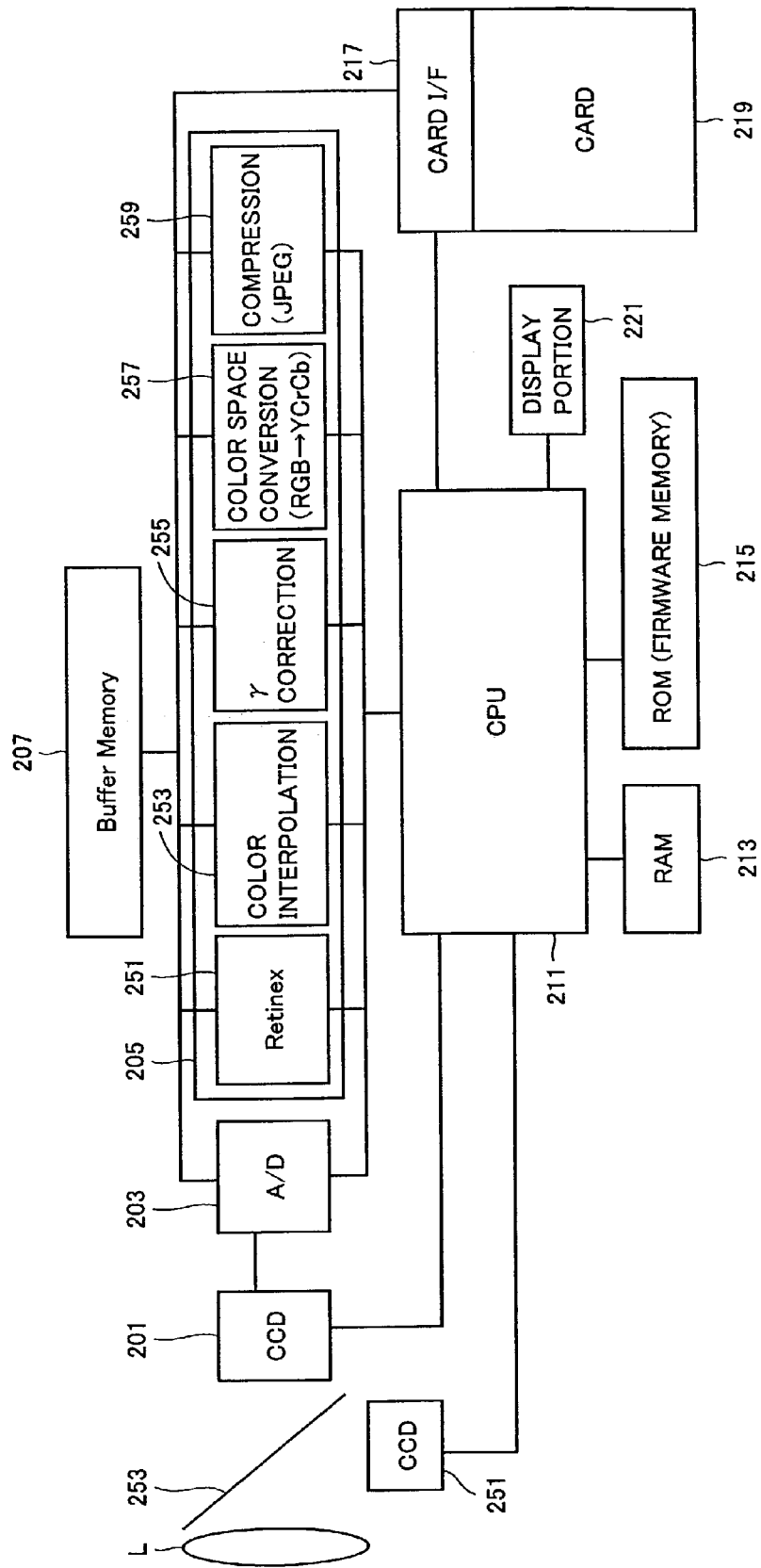
FIG. 16 is a block diagram showing a structure of a digital camera in a tenth embodiment.

FIG. 16 is a block diagram showing a structure of a digital camera of the tenth embodiment.

This digital camera differs from the digital camera (FIG. 4) of the fourth embodiment in that the digital camera in FIG. 16 includes a half mirror 253 and a CCD 251 for producing a blurred image. Instead of the half mirror, another lens may be used for applying light to CCD 251. However, in view of parallax, which may occur when shooting an object at a shot distance, it is desired to use the half mirror for leading the light coming from the same optical system to two lines.

In FIG. 16, CCD 251 is located in a position, where it can obtain a blurred image when CCD 201 focuses.

For the blurred image, an image pickup element, which has a lower resolution and thus is cheaper than that for the original image, can be used. In this case, the low resolution of the image for the blurred image is matched with the resolution of the image pickup element for the original image by interpolation, whereby it is possible to perform substantially the same processing as the Retinex processing performed on the blurred image produced from the image of the resolution, which is lowered as described above.

Eleventh Embodiment

Figure 17:
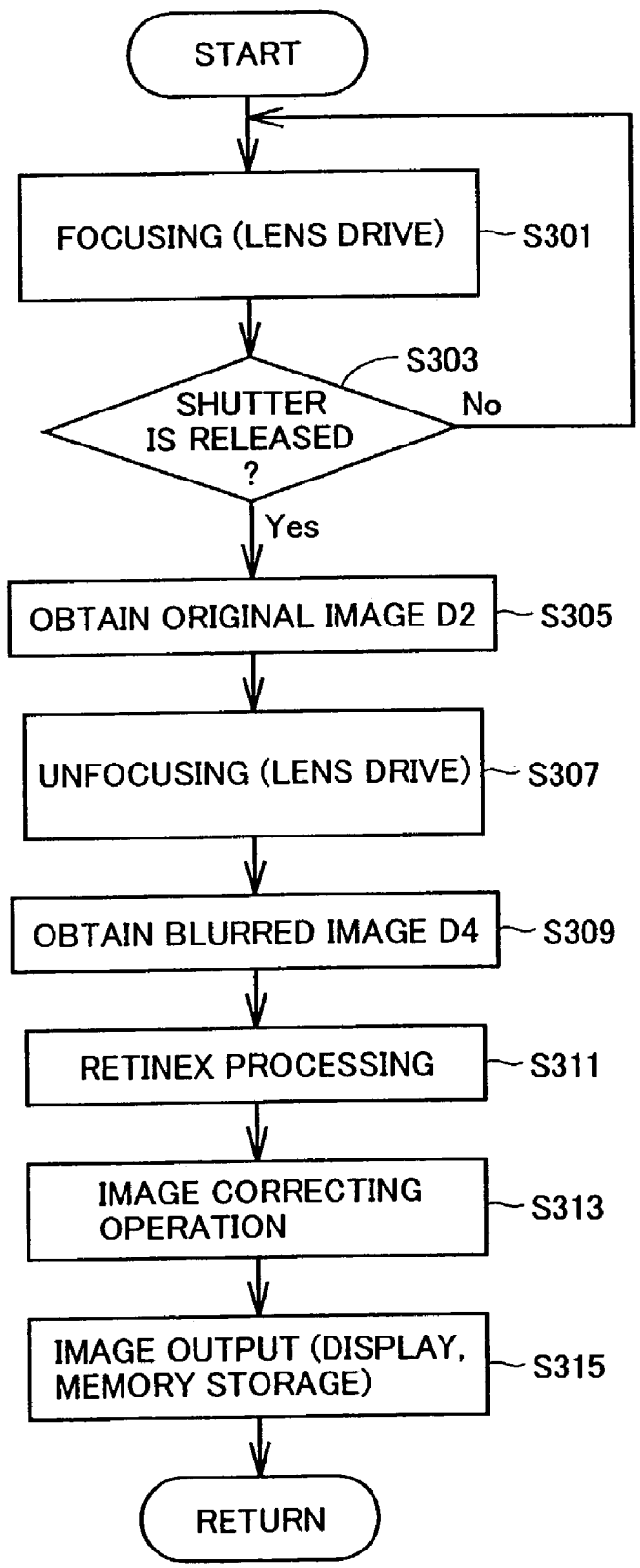
FIG. 17 is a flowchart illustrating image pickup processing of a digital camera in an eleventh embodiment.
Figure 18:
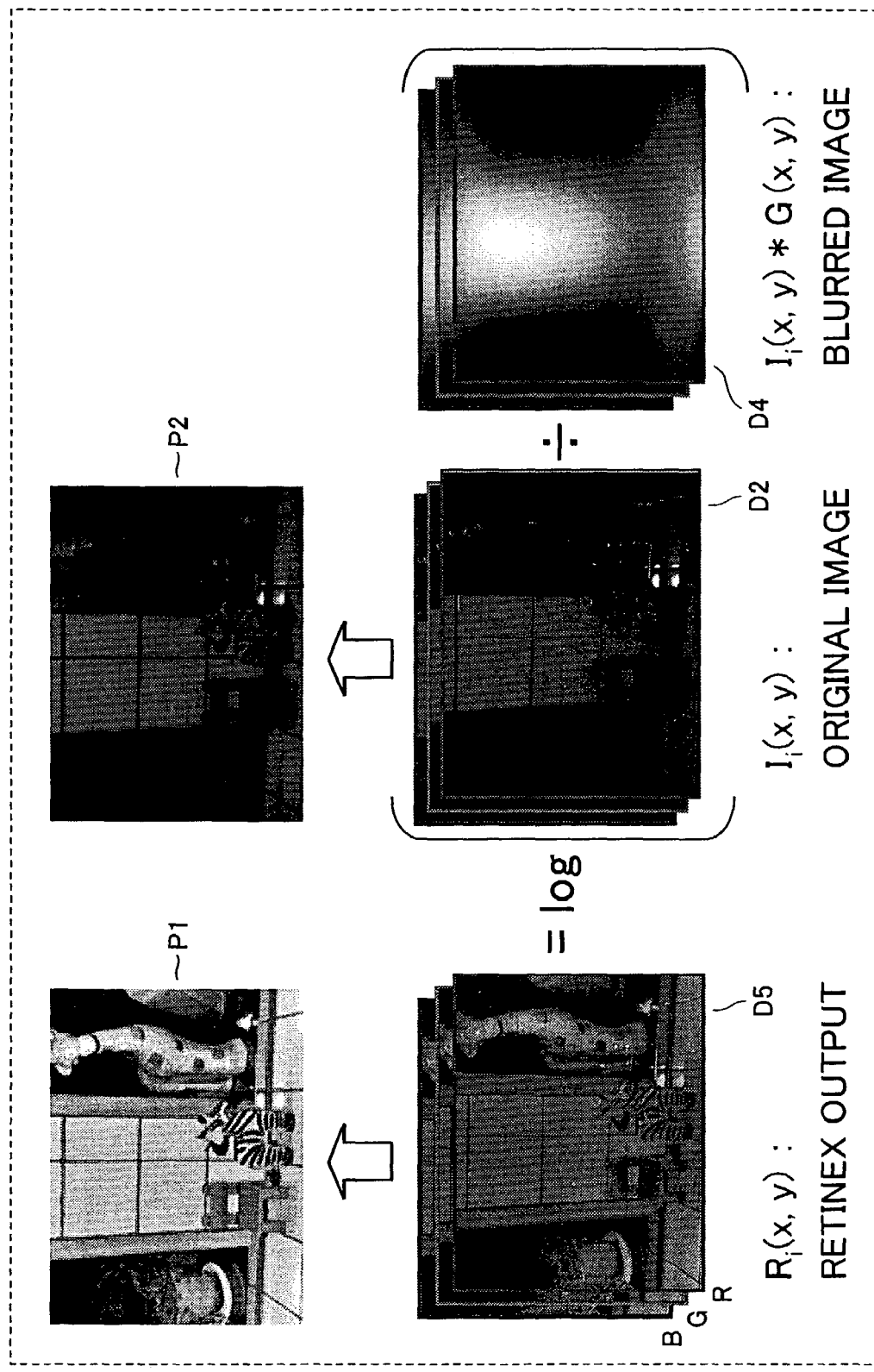
FIG. 18 illustrates specific SSR processing with a Gaussian function for producing a blurred image.

FIG. 17 is a flowchart illustrating image pickup processing of a digital camera in an eleventh embodiment.

This processing is executed by CPU 211 of the digital camera (FIG. 4) in the fourth embodiment.

Referring to FIG. 17, a lens control portion 209 performs lens drive processing for focusing (step S301). When a shutter is released (YES in step S303), CCD image pickup element 201 shoots original image D2 in a step S305. Thereafter, lens control portion 209 drives the lens in a step S307 to attain an unfocused state. In this state, blurred image D4 is obtained in a step S309.

Thereafter, the Retinex processing is performed based on images D2 and D4 (step S311), and image correcting processing is performed (step S313). Then, image output (display or memory storage) is performed (step S315).

When performing the MSR, the unfocused state is attained to different extents in steps S307 and S309, whereby blurred images at different levels are obtained.

According to the tenth and eleventh embodiments, it is not necessary to perform complicated operations such as convolution integral for producing the blurred images. Therefore, it is possible to provide an image pickup apparatus capable of fast Retinex processing.

The invention can be applied to digital cameras, digital video cameras, scanners, film scanners and other digital devices.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing program product recorded on a computer readable medium for executing a Retinex processing program by a computer, said Retinex processing is performed by the following steps:
   receiving a RAW image to be processed,
   producing a blurred image from said received RAW image, and
   executing the Retinex processing based on said RAW image and said blurred image.

2. The image processing program product according to claim 1, wherein said RAW image is data obtained immediately after A/D conversion effected on an electric signal from an image pickup device.

3. The image processing program product according to claim 1, wherein a predetermined gamma correction is effected on said RAW image after effecting the Retinex processing on said RAW image.

4. The image processing program product according to claim 1, wherein said Retinex processing includes processing of dividing said RAW image by said blurred image of said RAW image.

5. An image processing program product recorded on a computer readable medium for executing a Retinex processing program by a computer, said Retinex processing is performed by the following steps:
   a first step of producing an image by lowering a resolution of an original image to be processed,
   a second step of producing a blurred image from said image produced by lowering the resolution of said original image,
   a third step of restoring the resolution of said blurred image to the resolution of said original image, and
   a fourth step of executing said Retinex processing based on said original image and said blurred image having the resolution restored to the resolution of said original image.

6. The image processing program product according to claim 5, wherein
   said first step produces said image by converting the resolution of said original image to a predetermined resolution, and
   said second step produces said blurred image by using a filter of a predetermined size.

7. The image processing program product according to claim 5, wherein
   said first step produces said image by converting the resolution of said original image to a given resolution, and
   said second step produces said blurred image by using a filter of a size matching with said given resolution.

8. The image processing program product according to claim 7, wherein
   said second step includes a changing step of changing the filter size, and
   said changing step produces a Gaussian filter having a peripheral spread corresponding to a resolution of said image produced by temporarily lowering the resolution of the original image by changing a kernel value in the Gaussian filter in accordance with the resolution of each image.

9. An image processing program product recorded on a computer readable medium for executing a Multi-Scale Retinex processing program by a computer, wherein said computer executes:
   a first step of producing a plurality of images by lowering a resolution of an original image to be processed to multiple levels,
   a second step of producing a blurred image of each of said plurality of images by using a predetermined filter,
   a third step of restoring the resolutions of said plurality of produced blurred images to the resolution of said original image, and
   a fourth step of executing Multi-Scale Retinex processing based on said original image and said plurality of blurred images having the resolutions restored to the resolution of said original image.

10. An image processing program product recorded on a computer readable medium for executing a Multi-Scale Retinex processing program by a computer, wherein said computer executes:
    a first step of preparing a plurality of images including an original image by producing at least one image of a lower resolution from the original image to be processed,
    a second step of producing blurred images from at least two of said plurality of images by using a predetermined filter,
    a third step of restoring the resolution of each of said at least two blurred images to the resolution of said original image if said at least two blurred images have the resolutions different from the resolution of said original image, and
    a fourth step of executing said Multi-Scale Retinex processing based on said original image and said at least two blurred images having the resolution of said original image.

11. An image pickup apparatus for executing a Retinex processing program, comprising:
    an image pickup device for producing an original image to be processed,
    an optical means for optically producing a blurred image of said original image,
    a computer readable medium on which said Retinex processing program is recorded, and the original image and the blurred image are recorded, and a means for executing the Retinex processing program based on said original image and said blurred image to restore the image after Retinex processing to the resolution of the original image.

12. The image pickup apparatus according to claim 11, wherein said blurred image is produced from another image pickup device different from said image pickup device.

13. The image pickup apparatus according to claim 11, wherein said blurred image is produced by attaining an unfocused state in an optical system applying light to said image pickup device.

14. An image processing apparatus for executing a Retinex processing program recorded on a computer readable medium, comprising:
- a means for producing an original image;
- a means for producing an image by lowering a resolution of said original image to be processed;
- a means for producing a blurred image from the image produced by lowering the resolution of said original image;
- a means for restoring the resolution of said blurred image to the resolution of said original image; and
- a means for executing said Retinex processing program based on said original image and said blurred image having the resolution restored to the resolution of said original image.

15. An image processing apparatus for executing a Multi-Scale Retinex processing program encoded on a computer readable medium, comprising:
- a means for producing an original image;
- a means for producing a plurality of images by lowering a resolution of an original image to be processed to multiple levels,
- a means for producing a blurred image of each of said plurality of images by using a predetermined filter,
- a means for restoring the resolutions of said plurality of produced blurred images to the resolution of said original image, and
- a means for executing said Multi-Scale Retinex processing program based on said original image and said plurality of blurred images having the resolutions restored to the resolution of said original image.

* * * * *